(12) United States Patent
Kawatani

(10) Patent No.: US 7,225,120 B2
(45) Date of Patent: May 29, 2007

(54) METHOD OF EXTRACTING IMPORTANT TERMS, PHRASES, AND SENTENCES

(75) Inventor: Takahiko Kawatani, Kanagawa (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 1117 days.

(21) Appl. No.: 10/156,869

(22) Filed: May 30, 2002

(65) Prior Publication Data

US 2003/0028558 A1    Feb. 6, 2003

(30) Foreign Application Priority Data

May 30, 2001    (JP)    ............................ P2001-204062

(51) Int. Cl.
*G06F 17/30*    (2006.01)
*G06F 17/28*    (2006.01)

(52) U.S. Cl. ............................................. 704/7; 704/9
(58) Field of Classification Search ...................... None
See application file for complete search history.

(56) References Cited

U.S. PATENT DOCUMENTS 6,671,683 B2 * 12/2003 Kanno ........................... 707/5

6,775,677 B1 * 8/2004 Ando et al. .................. 707/102
2002/0174149 A1 * 11/2002 Conroy et al. .............. 707/531
2003/0037073 A1 * 2/2003 Tokuda et al. .............. 707/500

OTHER PUBLICATIONS

Berry et al. "Matrices, Vector Spaces, and Information Retrieval" SIAM Review, vol. 41, No. 2, pp. 335-562.*
Manning, C.D. and Schutze, H., *Foundations of Statistical Natural Language Processing*, Section 15.2.2 (p. 541-544) The MIT Press, 1999.
Hahn, U. and Mani, I. "The Challenges of Automatic Summarization," *Computer*, 33, 11, pp. 29-36 (Nov. 2000).

* cited by examiner

*Primary Examiner*—V. Paul Harper
(74) *Attorney, Agent, or Firm*—Lowe Hauptman & Berner, LLP

(57) ABSTRACT

A computer extracts important terms, phrases or sentences from a document that it segments. The computer generates a square sum matrix from the document segments. The computer determines the importance of a given term, phrase or sentence on the basis of eigenvectors and eigenvalues of the matrix. The computer thereby selects the important terms, phrases or sentences related to the central concepts of the document.

18 Claims, 4 Drawing Sheets

METHOD OF EXTRACTING IMPORTANT TERMS, PHRASES, AND SENTENCES

BACKGROUND OF THE INVENTION

1. Field of the Invention

The present invention relates to a method of and apparatus for automatically extracting an important item, e.g., words, phrases, and/or sentences from a document, and more particularly to such a method and apparatus wherein the importance of the items is determined from eigenvectors and eigenvalues of a square sum matrix of segments of the documents.

2. Description of the Related Art

Considerable research and development have been made in the field of document and information searching for automatically extracting important items, e.g., words, phrases and sentences, from a document in the field of document and information search. Techniques for such automatic extraction are roughly divided into heuristic and static approaches.

The heuristic approach uses document headline information, in-document positional information, and cue expression. The document headline information method is based on the concept that "the document title or headline, briefly expressing document content, includes important terms." The important terms are obtained by excluding from the terms in the headline or title unimportant terms such as articles and prepositions. The heuristic method is premised on the existence of a title or headline, and is not applicable to a document which does not include a title or headline.

The in-document positional information method relies on the fact that an important sentence is intentionally written in the initial part of a newspaper article or the like, such that important terms are extracted from a sentence at the front part of an article. This method can be used only if it is known in advance where the important part of a document is, as in a newspaper article.

The cue expression method is premised on an important sentence beginning with a particular phrase, e.g. "as a result." In the cue expression method, such a particular phrase is extracted by natural-language processing so the range of extracted important terms is limited to sentences including such phrases. The cue extraction method can not be applied to works or paragraphs that do not have such a premised cue expression.

In the well-known statistical approach method, an important term is defined as a frequently occurring term in an object document. This method uses in-document occurrence frequency (tf) as a measure of importance. A problem with this method is that the high-frequency term in a document is not necessarily an important term. A so-called tf-idf model has been developed to solve the problem. The tf-idf model is based on the concept that a term occurring in many documents is less important and importance of a term is inversely proportional to the number of documents including the term, and that importance of the term in a particular document is directly proportional to the occurrence of the term in the document. The expression "tf-idf" is defined as the product of tf and idf, where idf is the inverse of df, and df is the number of documents including the term in a corpus in which the object document is included. This model is a well-known approach. However, because the definition is based on the product of in-corpus term importance and in-document term importance, there still remains a problem of how to accurately define in-document importance.

When a document is given as mentioned above, it is important how in-document importance of each term is determined. The calculation of in-document importance is premised on using only the information contained in a given document. The foregoing term importance within a corpus is a quantity related to the probability for a term to occur in one document. On the other hand, since in-document importance must be obtained within one document, in-document importance should be a measure of the extent to which the term represents the document content, i.e. document concept. Accordingly, during extraction of important terms/phrases from a document, terms/phrases representative of concepts of the document take top priority. For this reason, it is necessary that extraction of central concepts of a document lead to a grasp of the relationship between a term/phrase and the central concept of the document. In the conventional methods, however, it is not necessarily clear to what degree an extracted important term/phrase reflects central concepts of a document. Accordingly, it often happens that terms/phrases irrelevant to a document concept are regarded as important or that terms/phrases which merely have a high frequency are extracted as important terms/phrases.

SUMMARY OF THE INVENTION

In order to solve the problems as mentioned above, an important item is extracted from an input document including at least one document segment by generating, for the at least one document segment, document segment vectors having values relating to occurrence frequencies of terms occurring in the at least one document segment as component values. A square sum matrix is generated from the document segment vectors. Eigenvectors and eigenvalues of the square sum matrix are calculated. The important item of the input document is selected from the calculated eigenvectors and eigenvalues of the square sum matrix, to enable the important item to be supplied to an output device. Preferably, a computer automatically performs the generating, calculating and selecting operations.

The item can be a term, a phrase or a sentence.

Preferably, the selecting operation includes selecting a definite number of eigenvectors and eigenvalues from the eigenvectors and the eigenvectors. Item vectors are generated with respect to the items in the input document. The dimension of the item vector is the number of terms in the document. If the item is a term, only the component corresponding to the term takes a first binary value (e.g., 1) and the other components have a second binary value (e.g., 0). If the item is a phrase or a sentence, only the components corresponding to the terms included in the phrase or the sentence take a first binary value. A measure of the importance of the items is obtained by using the definite number of eigenvectors, the definite number of eigenvalues, and the item vectors.

The square sum matrix is preferably calculated as:

$$S = \sum_{m=1}^{M} d_m d_m^T$$

where
M=the number of the document segments,
an m-th document segment vector is $d_m = (d_{m1}, \ldots, d_{mN})^T$ and (m=1, ..., M)
N=number of terms, T denotes transpose of a vector, and $d_{mn}$ denotes a value relating to an occurrence frequency of an n-th term occurring in the document segments.

In a preferred embodiment, the importance measure of the item with respect to the eigenvector of each order is obtained by a product of a squared inner product between the eigenvector of the order and the item vector, and the eigenvalue of the order.

When the item is a term, the importance of the item can be normalized by a value of a diagonal component corresponding to each term in the square sum matrix or a value relating thereto. When the item is a phrase or a sentence, the importance of the item can be also normalized properly.

The importance measure of the item with respect to the input document can be obtained by using weights calculated from the eigenvalues of respective orders and by a weighted sum of products of a squared inner product between the eigenvector of each order and the item vector, and the eigenvalue of the order over the definite number of orders.

Another aspect of the invention, which can also be automatically performed with a data processor, involves extracting an important item from an input document including one or plural document segments by generating document segment vectors having, as components, values relating to occurrence frequencies of terms occurring in the document segments. An item vector is generated with respect to an item in the input document. In the item vector, the occurrence numbers of terms contained in the item are assigned to components corresponding to the terms in the item, and the other components are assigned a binary zero value. A measure of the importance of the item is obtained by using a sum of squared inner products between the item vector and all the document segment vectors. The important item of the input document is selected by using the importance measure. Such an item is typically a phrase or sentence, rather than a term. Preferably, the importance is a normalized measure of the item with the squared norm of the item vector.

Thus, components of the document segment vector have values determined on the basis of the number of times each term occurs in a document segment, that is, frequency of the term in the document segment. The document segment vector expresses the concept of the document segment. The most natural unit of the document segment is a sentence. Obtaining the eigenvectors and eigenvalues of the square sum matrix obtained for the set of the document segment vectors enables the set of the document segment vectors to be expanded by using the eigenvalues and the eigenvectors which are orthogonal to each other. Since the eigenvector is a vector represented by a combination of terms, the vector represents a concept. Since the eigenvector is intrinsic to a document, the concept represented by the eigenvector is called an eigenconcept. The eigenvalue can also be regarded as the strength or the energy of the concept represented by the eigenvector. Accordingly, an eigenvector corresponding to a large eigenvalue, that is, a low order eigenvector, can be regarded as representing the central concept of the document.

A projection value of a term vector or a phrase vector onto an eigenvector is a component of the term vector or the phrase vector in the direction of an eigenconcept corresponding to the eigenvector. The square of the projection value represents the energy of the component. The product of the square of the projection value and the corresponding eigenvalue is defined as the importance of a given term vector or phrase vector with respect to a given eigenconcept. An important item (particularly a term or phrase) related to the concepts of the document is selected on the basis of this product.

The above and still further objects, features and advantages of the present invention will become apparent upon consideration of the following detailed descriptions of several specific embodiments thereof, especially when taken in conjunction with the accompanying drawings.

DETAILED DESCRIPTION OF THE DRAWING

Figure 1:
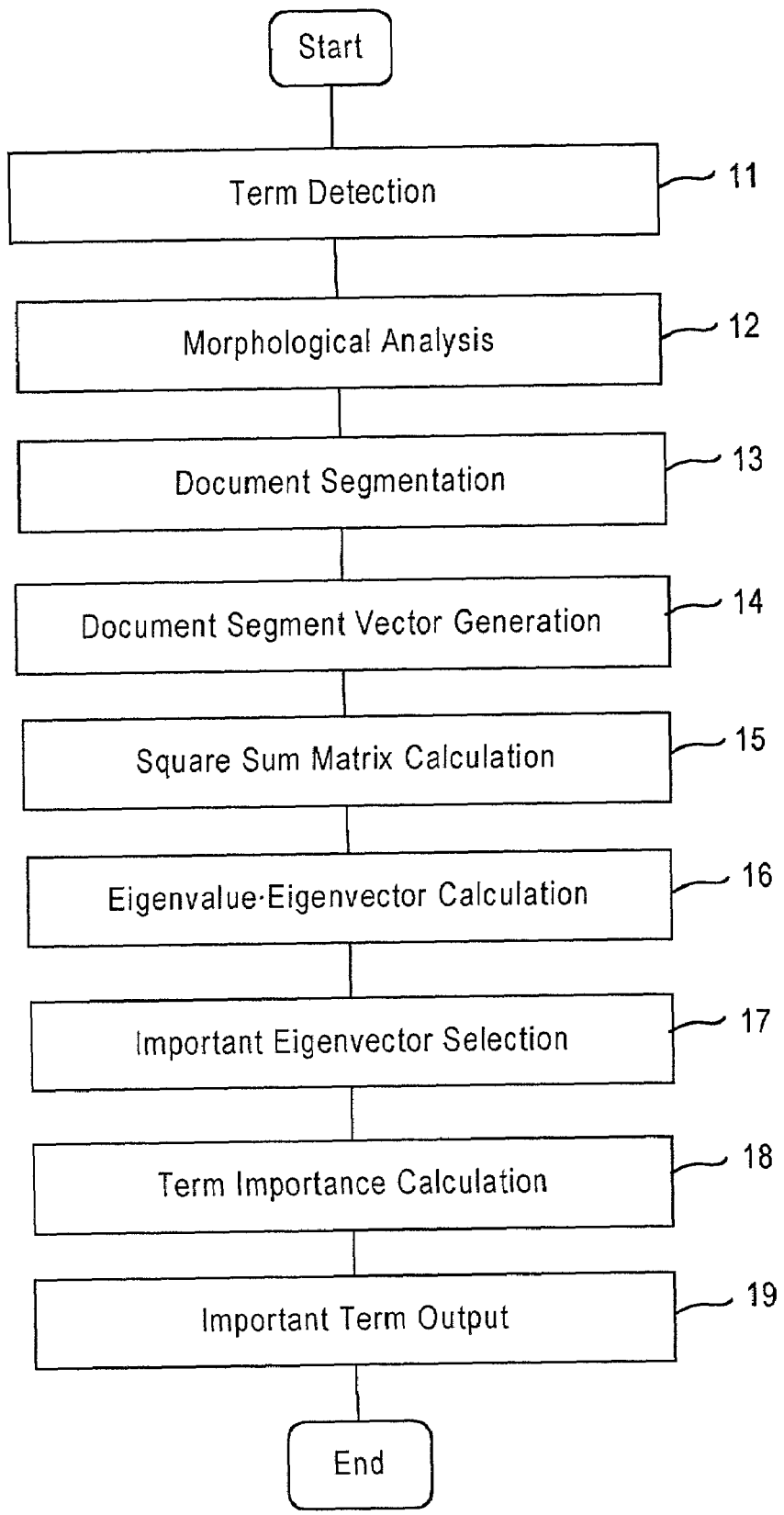
FIG. 1 is a flow diagram of operations a computer system performs according to a first embodiment of the invention.

FIG. 1 is a flow diagram of a first embodiment for extracting important terms from a document. The flow diagram of FIG. 1 can be carried out by running a program on a general-purpose computer.

During operations 11, 12, 13, 14, 15, 16, 17, 18 and 19, the computer respectively performs (1) term detection, (2) morphological analysis, (3) document segmentation, (4) document segment vector generation, (5) square sum matrix calculation, (6) eigenvalue and eigenvector calculation, (7) important eigenvector selection, (8) importance calculation, and (9) important term readout. Hereinafter, the operations of the computer associated with FIG. 1 will be described using an English language document as an example.

During term detection operation 11, the computer detects words and symbol sequences, such as numerals, that are in the document supplied to the computer for analysis. The words and symbol sequences are generally referred to as terms. In the case of an English language sentence, since each word is written separately with spaces between adjacent words, detection of the words is easy. Next, during morphological analysis operation 12, the computer performs a morphological analysis such as tagging parts of speech. Next, the computer segments the document into sentences. Since each English language sentence ends with a period and is followed by a space, the computer easily separates sentences from the document. Other methods of segmenting a document include (1) segmenting a complex sentence into a principal clause and a subordinate clause, (2) grouping plural sentences into group document segments so that the number of terms in each is almost the same, and (3) grouping the terms of the document, from the beginning of the document, so that the number of terms in each group is the same, irrespective of sentence structure.

During document segment vector generation step 14, the computer initially generates the dimensions of the vectors from terms occurring in the document and then determines the correspondence between the respective components and the respective terms. It is not necessary to make the vector components of the vector correspond to all kinds of terms occurring in the document. The computer can generate the vector by using only some parts of speech, for example, by using only terms the computer judges to be nouns and verbs. Next, the computer detects the kinds and frequencies of terms occurring in the respective document segments. The computer then generates document segment vector values of corresponding components by multiplying the frequency values by weighting factors. A conventional technique can be used to determine the weighting factors.

During square sum matrix calculation step 15, the computer calculates a square sum matrix of the respective document segment vectors. It is assumed that the analyzed document has N terms which the computer segments into M document segments. The computer expresses an m-th document segment vector $d_m$ (m=1, ..., M) by $(d_{m1}, ..., d_{mN})^T$, and calculates the square sum matrix $S=(S_{ij})$ by using Expression (1):

$$S = \sum_{m=1}^{M} d_m d_m^T, \quad (1)$$

where T expresses a transpose of a vector.

During the eigenvalue and eigenvector calculation of step 16, the computer calculates the eigenvalues and eigenvectors of matrix S. Let $\phi_k$ and $\lambda_k$ respectively represent the k-th order eigenvector and eigenvalue. The eigenvector $\phi_1$ is an axis which maximizes the squared sum of projection values when all document segment vectors are projected. Consequently $\phi_1$ represents a concept most common to the respective document segments. The eigenvalue $\lambda_1$ is the squared sum of the projection values, and can be regarded as representing the strength or energy of the concept expressed by $\phi_1$. The eigenvector $\phi_2$ is an axis which maximizes the squared sum of the projection values under the condition that $\phi_2$ is orthogonal to $\phi_1$. The same applies to $\phi_3$ and the following eigenvectors. The eigenvectors obtained in this way become the basis of a subspace approximating the set of the document segment vectors. When the computer uses the eigenvectors up to the L-th order, the number of dimensions of the subspace becomes L, and the computer expands the concept of the input document by the L eigenvectors having concepts orthogonal to each other.

During important eigenvector selection operation 17, the computer specifically determines the value of L. If matrix S has a rank R, the computer obtains R eigenvectors from S to indicate that the document originally has R eigenconcepts. The computer discards (R−L) eigenconcepts from the subspace and expresses the central concepts of the document by the combination of L eigenconcepts. The basis vectors of the subspace are eigenvectors up to the L-th order. The computer then calculates Expression (2) to express the energy ratio of the central concepts to the original concepts. Expression (2) is a measure of the energy ratio of the central concepts to the original concepts when the computer has actually determined the value of L.

$$\sum_{k=1}^{L} \lambda_k \Big/ \sum_{k=1}^{R} \lambda_k. \quad (2)$$

During importance calculation step 18, the computer obtains the importance to an eigenconcept corresponding to a selected eigenvector for each term. Consider the n-th term, $w_n$ and let $v_n$ be the vector of a document segment in which only the n-th term occurs; that is, $v_n$ is a vector (term vector) in which only the n-th component has a binary value of 1 and the other components have a binary value of 0. In such a situation, the computer initially obtains the projection energy E of all document segment vectors onto $v_n$. The computer determines the energy E in accordance with:

$$E = \sum_{m=1}^{M} (d_m^T v_n)^2 = \sum_{m=1}^{M} f_{mn}^2 = s_{nn}. \quad (3)$$

If any term does not occur more than once in each of the document segments, the computer causes (1) $S_{nn}$ to become the occurrence frequency of the n-th term $w_n$ in the document, and (2) uses the conventional method of determining the document occurrence frequency (tf), which is regarded as the importance of $w_n$. The computer regards the importance of $w_n$ as being E. The computer then modifies Expression (3) as follows:

$$E = \sum_{m=1}^{M} (d_m^T v_n)^2 = v_n^T S v_n = \sum_{k=1}^{R} \lambda_k (\phi_k^T v_n)^2. \quad (4)$$

To derive Expression (4), the computer determines E from the total sum of contributions from the eigenconcepts of all orders. Accordingly, imp($w_n$, k), the importance of $w_n$ with respect to the k-th eigenconcept, can be defined by:

$$\text{imp}(w_n, k) = \lambda_k (\phi_k^T v_n)^2 = \lambda_k \phi_{kn}^2 \quad (5),$$

where, $\phi_{kn}$ is an n-th component of $\phi_k$.

In the definition of Expression (5), imp($w_n$, k) is directly influenced by the value of the occurrence frequency of $w_n$. Thus, in Expression (5), the computer can use the value normalized by $S_{nn}$ as an indication of the importance of a term. In this case, the computer determines importance as:

$$\text{imp}(w_n, k) = \lambda_k \phi_{kn}^2 / S_{nn} \quad (6).$$

The computer importance term output step 19 indicates the important terms of the input document on the basis of the value of each imp($w_n$, k). The computer uses one of the following two methods for determining the important terms of the input document.

(1) In the first method, the computer uses either Expression (5) or Expression (6), with respect to the respective eigenconcepts up to a definite order L. In the first method, the computer extracts a definite number of important terms and outputs them in order of importance. The computer must determine, however, how many important terms should be extracted for each k. One way the computer makes the determination is to make the number of extracted important terms for each k directly proportional to the value of $\lambda_k$.

(2) In the second method, the computer uses mathematical Expression (7) or mathematical Expression (8). In the first step of the second method the computer obtains the sum from k=1 to R with respect to each imp($w_n$, k). The sum defines the importance for the document. Then, the computer extracts a definite number of terms and outputs them in order of importance. Since as mentioned above, the lower orders of the eigenconcepts are closer to the central concepts, the computer emphasizes imp($w_n$, k) of the lower orders. Let imp($w_n$) and $\omega_k$ be the importance of the term $w_n$ with respect to the document and the weight of the k-th order eigenconcept, respectively. The importance can be defined by $$imp(w_n) = \sum_{k=1}^{R} \omega_k \lambda_k \phi_{kn}^2, \quad (7)$$

or $$imp(w_n) = \sum_{k=1}^{R} \omega_k \lambda_k \phi_{kn}^2 / S_{nn}. \quad (8)$$

Since $\omega_k$ of the lower order k is set at a larger value, the following expression can be used to give the value $\omega_k$.

$$\omega_k = \lambda_k \bigg/ \sum_{k=1}^{R} \lambda_k. \quad (9)$$

Since $\omega_k$ of higher order k takes a smaller value, the sum from k=1 to R can be replaced by the sum from k=1 to L in Expression (8).

Figure 2:
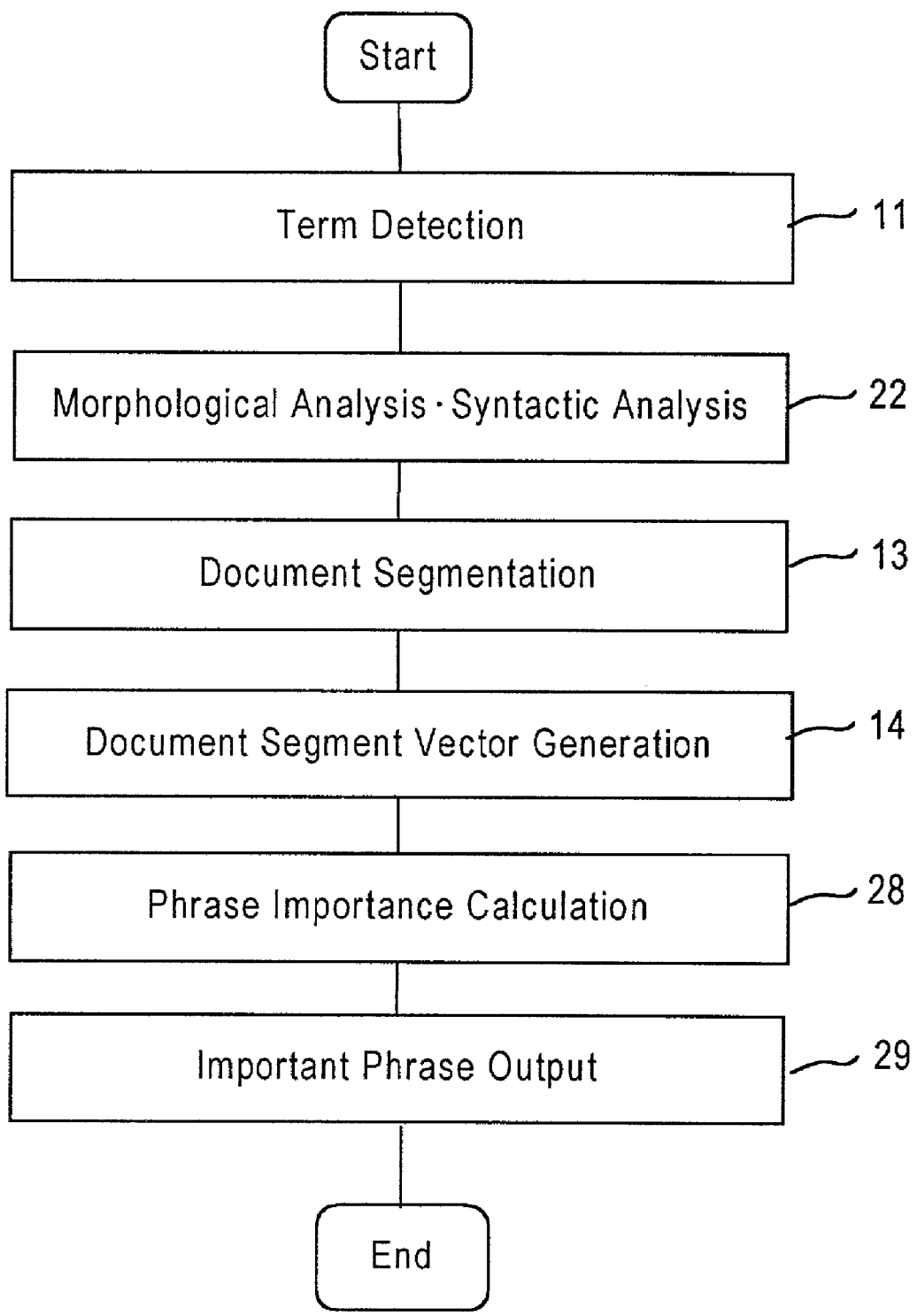
FIG. 2 is a flow diagram of operations a computer system performs according to a second embodiment of the invention.

FIG. 2 is a flow diagram of the program the computer uses for extracting important phrases. The method of FIG. 2 can be carried out by running the program on a general-purpose computer.

During step 11, the computer detects terms. During step 22, the computer performs a morphological analysis and syntactic analysis. During steps 13 and 14, the computer performs document segmentation and generates document segment vectors, respectively. During steps 28 and 29, the computer calculates importance and outputs important phrases, respectively. Steps 11, 13 and 14 of FIG. 2 are the same as steps 11, 13, and 14 in FIG. 1.

During step 22, the computer (1) performs a syntactic analysis, (2) performs the morphological analysis in the same way as in step 12 of FIG. 1, and (3) detects phrases as estimate objects of importance. A phrase is defined as a term sequence function as a part of speech. The computer selects important phrases from phrases detected during step 22.

During importance calculation step 28, the computer obtains the importance of each phrase. Let $p=(p_1, \ldots, p_N)^T$ be the phrase vector of a phrase composed of plural terms. The phrase vector p is a vector in which components corresponding to terms constituting the phrase are assigned the occurrence numbers of the terms in the phrase and the other components are assigned zero values. The importance imp(p) of a phrase is defined as a squared sum of inner products of all document segment vectors and p. The importance imp(p) can be set forth as follows:

$$Imp(p) = \sum_{m=1}^{M} (d_m^T p)^2. \quad (12)$$

Expression (12) indicates that (document energy)×(phrase energy) in the direction of the phrase vector represents the importance of the phrase. In the definition of Expression (12), there is a possibility that the length of the phrase erroneously influences the importance of the phrase. To avoid such an erroneous possibility, importance of the phrase is obtained by normalizing with the square of a norm of the phrase vector as follows:

$$Imp(p) = \sum_{m=1}^{M} (d_m^T p)^2 / \|p\|^2. \quad (13)$$

The computer calculates the squared sum of the inner products of all the document segment vectors and p appearing in both Expressions (12) and (13) by using the square sum matrix $S=(S_{ij})$ obtained during the square sum matrix calculation step 15 of FIG. 1 as follows:

$$\sum_{m=1}^{M} (d_m^T p)^2 = \sum_{i=1}^{N} \sum_{k=1}^{N} p_i p_k S_{ik}. \quad (14)$$

Accordingly, the computer, in executing the program of FIG. 2, performs similar processing to the square sum matrix calculation step 15 of FIG. 1, and uses the importance defined by Expression (12) or Expression (13) by performing the calculation of Expression (14). When the computer derives the important phrase during output step 29, the computer selects a definite number of phrases and outputs them in order of importance obtained for the respective phrases.

In the second embodiment of FIG. 2, the computer can be modified to extract an important sentence in the manner described below. During step 13, the computer extracts (1) all sentences and (2) the document segments used during step 14. During step 28, the computer sets a sentence vector in which the occurrence numbers of terms in a sentence equals the values of corresponding components. The computer uses the sentence vector instead of the phrase vector.

Figure 3:
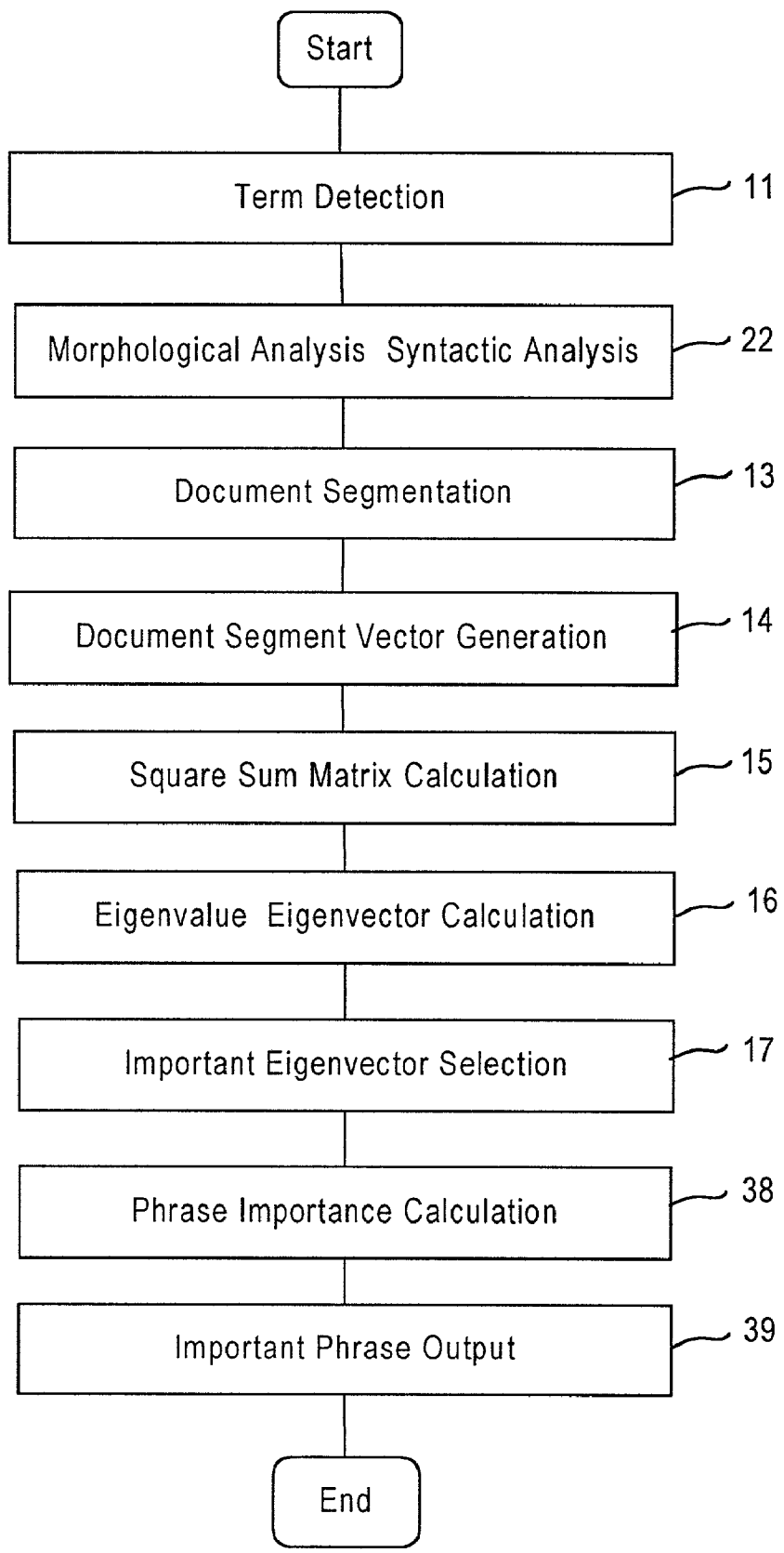
FIG. 3 is a flow diagram of operations a computer system performs according to a third embodiment of the invention.

FIG. 3 is a flow diagram of another program for extracting important phrases. The method indicated by the flow chart of FIG. 3 can be performed by running a program on a general-purpose computer.

During steps 11, 22 and 13, the computer respectively (1) detects terms, (2) performs morphological analysis and syntactic analysis, and (3) performs document segmentation. During steps 14, 15, 16, 17 and 38, the computer respectively (1) performs document segment vector generation, (2) calculates a square sum matrix, (3) calculates eigenvalues and eigenvectors, (4) selects the important eigenvector, and (5) calculates importance of the phrase. During step 39, the computer derives an important phrase output. Steps 11 and 13-17 in FIG. 3 are the same as the steps having the same reference numerals in FIG. 1. Step 22 in FIG. 3 is the same as step 22 in FIG. 2.

During importance calculation step 38 of FIG. 3, the computer determines, for each phrase, the importance of an eigenconcept corresponding to a selected eigenvector. Similarly to FIG. 2, let $p=(p_1, \ldots p_N)^T$ be the phrase vector of a phrase composed of plural terms. The importance imp(p) defined by the Expression (12) is:

$$imp(p) = \sum_{m=1}^{M} (d_m^T p)^2 = \sum_{k=1}^{R} \lambda_k (\phi_k^T p)^2. \quad (15)$$

The importance imp(p) can be regarded as the sum of importance of the phrase with respect to the eigenconcepts of respective orders. The computer calculates the importance imp(p, k) during step 38 as:

$$imp(p,k) = \lambda_k (\phi_k^T p)^2 \quad (16).$$

In Expression (16), there is a tendency for the value of importance to increase as the value of imp(p) defined by Expression (15) or the squared norm of p increases. As the value of imp(p) increases, the computer can normalize by using the value of imp(p) given by Expression (14), and determine imp(p, k) as a relative value that does not depend on imp(p). In this case, the computer calculates imp(p, k) as:

$$imp(p, k) = \lambda_k (\phi_k^T p)^2 \Big/ \sum_{i=1}^{N} \sum_{k=1}^{N} p_i p_k S_{ik}. \quad (17)$$

To make imp(p, k) be independent of the squared norm of p, the computer calculates imp(p, k) as:

$$imp(p,k) = \lambda_k (\phi_k^T p)^2 / \|p\|^2$$

During important phrase output step 39, the computer determines and outputs important phrases of an input document on the basis of the value of each imp (p, k). The computer can perform determining step 39 in two ways, as described below. The two possible determinations of step 39 are similar to the way the computer performs the important term determination step 19, in FIG. 1.

In the first method of step 39, the computer performs the calculation of Expression (16) or (17). To that end, the computer extracts a definite number of important phrases in order of importance with respect to the respective eigenconcepts up to a definite order L. The computer determines, during step 39, that the number of extracted important phrases for each k is proportional to the value of In the second method of performing step 39, the computer initially calculates Expression (18). The computer calculates the sum of Expression (18) with respect to each imp(p,k) from k=1 to R to again determine the importance imp(p) for the document. Then, during step 39, the computer extracts a definite number of phrases and outputs them in order of importance with respect to the document. Since, as previously described, the lower order eigenconcepts are closer to the central concepts, the computer emphasizes the lower orders of imp(p, k). Let $\omega_k$ be the weight to the k-th order eigenconcept. The importance is defined by:

$$imp(p) = \sum_{k=1}^{R} \omega_k imp(p, k). \quad (18)$$

The computer calculates $\omega_k$ by using Expression (9). As the value of k in Expression (9) increases, the value of $\omega_k$ decreases. The sum from k=1 to R in Expression (18) can be replaced by the sum from k=1 to L.

In the program of FIG. 3, the computer can extract an important sentence in the manner previously described for extracting an important phrase. That is, during step 13, the computer extracts all sentences and document segments used for step 14.

During step 38, the computer employs a sentence vector in which the number of terms in each sentence is set as the value of corresponding components. Hence, it is not necessary to use a phrase vector.

Figure 4:
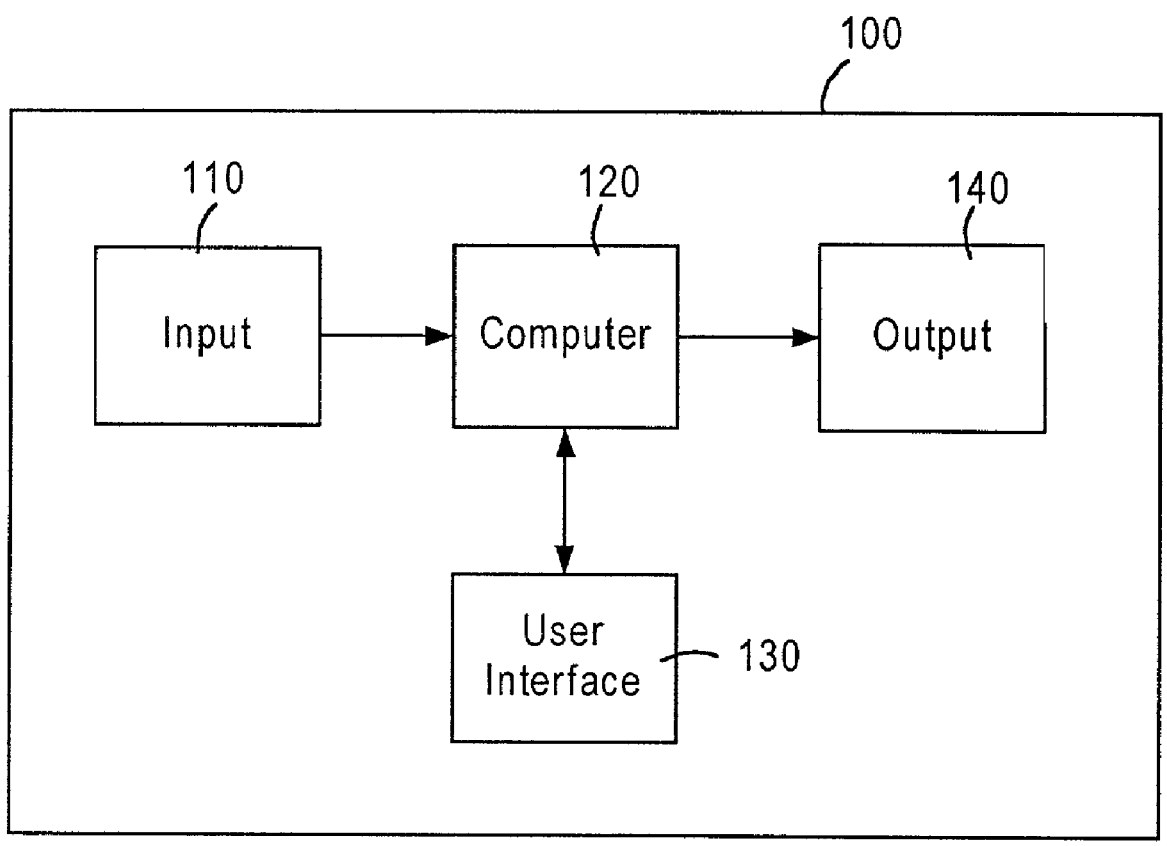
FIG. 4 is a block diagram of a computer system for performing the operations of FIGS. 1-3.

FIG. 4 is a basic structural view of an apparatus 100 for extracting important items, e.g., important terms, important phrases, and important sentences. A document including terms, phrases, and sentences which a user desires to extract is supplied to the computer via input section 110. The important item type the user desires to extract, e.g., important terms, or phrases, or sentences, is specified by the user supplying an input to user operation section 130. Computer section 120 responds to the inputs from sections 110 and 130 to extract the important terms, important phrases, or important sentences from the document by using one of the programs illustrated by the flow charts of FIGS. 1-3. Computer section 120 supplies the extracted important terms, important phrases and important sentences to output section 140.

In order to confirm the effect of the program of FIG. 1, 44 nouns occurring two or more times in an English document composed of 58 sentences were used as terms supplied to a computer programmed in accordance with FIG. 1. The computer generated document segment vectors in sentence units, and extracted important terms. The obtained result had a high correlation with important terms based on human detection, such that the terms a person considered to be important were extracted by the computer as important terms. Since terms are extracted as important terms in accordance with the central concepts of a document, the performance of extracting important terms is remarkably improved.

While there have been described and illustrated specific embodiments of the invention, it will be clear that variations in the details of the embodiments specifically illustrated and described may be made without departing from the true spirit and scope of the invention as defined in the appended claims.

What is claimed is:

1. A method of extracting an important term from an input document including one or plural document segments, comprising the steps of:
   (a) generating, for the respective document segments, document segment vectors having values relating to occurrence frequencies of terms occurring in the document segments as component values;
   (b) generating a square sum matrix from the document segment vectors to calculate eigenvectors and eigenvalues of the square sum matrix;
   (c) selecting and outputting a definite number of eigenvectors and eigenvalues of the square sum matrix;
   (d) generating, with respect to the terms in the input document, term vectors in which only components corresponding to the terms included in the items have a first binary value and the other components have a second binary value;
   (e) obtaining a measure of the importance of the terms by using the definite number of eigenvectors, the definite number of eigenvalues, and the term vectors;
   (f) selecting and outputting the important term of the input document by using the importance;
   (g) the square sum matrix is calculated as;

$$S = \sum_{m=1}^{M} d_m d_m^T$$

where:
M=the number of the document segments, an m-th document segment vector is $d_m=(d_{m1}, \ldots, d_{mN})^T$ and $(m=1, \ldots, M)$, and N=the number of terms, T denotes transpose of a vector, and $d_{mn}$ denotes a value relating to an occurrence frequency of an n-th term occurring in the document segments.

2. The method of claim 1 wherein the item is one of a term, a phrase, or a sentence.

3. The method of claim 2 wherein the importance measure of the item with respect to the eigenvector of each order is obtained by obtaining a product of a squared inner product between the eigenvector of the order and the item vector, and the eigenvalue of the order.

4. The method of claim 3 wherein the item is a term, and the importance measure of the item is obtained by normalizing with a value of a diagonal component corresponding to each term in the square sum matrix or a value relating thereto.

5. The method of claim 3 wherein the item is a phrase or a sentence and the importance measure of the item is obtained by normalizing with a value of the squared norm of the item vector or a value of a squared sum of inner products between the all document segment vectors and the item vector or a value relating thereto.

6. The method of claim 2 wherein the importance measure of the item with respect to the input document is obtained by using weights calculated from the eigenvalues of respective orders and by a weighted sum of products of a squared inner product between the eigenvector of each order and the item vector, and the eigenvalue of the order over the definite number of orders.

7. The method of claim 6 wherein the item is a term and the importance measure of the item is obtained by normalizing with a value of a diagonal component corresponding to each term in the square sum matrix or a value relating thereto.

8. The method of claim 6 wherein the item is a phrase or a sentence and the importance measure of the item is obtained by normalizing with a value of the squared norm of the item vector or a value of a squared sum of inner products between the all document segment vectors and the item vector or a value relating thereto.

9. A method of extracting an important term from an input document including one or plural document segments, comprising the steps of:
(a) generating document segment vectors having, as components, values relating to occurrence frequencies of terms occurring in the document segments;
(b) generating, with respect to an item in the input document, an item vector in which occurrence numbers of terms contained in the item are assigned to components corresponding to the terms in the item, and the other components are assigned a zero value;
(c) obtaining a measure of the importance of the item by using a sum of squared inner products between the item vector and all the document segment vectors;
(d) selecting and outputting the important item of the input document by using the importance measure; and
(e) determining the importance measure of the item by normalizing with the squared norm of the item vector.

10. The method of claim 9 wherein one of a term, a phrase, or a sentence.

11. An apparatus for extracting an important term from an input document including one or plural document segments, comprising:
(a) a data processor arrangement,
(b) an input device for supplying the document to the data processor arrangement,
(c) the data processor arrangement being arranged to be responsive to the document supplied to it by the input device for:
(i) generating, for the respective at least one document segment, document segment vectors having values relating to occurrence frequencies of terms occurring in the respective at least one document segment as component values;
(ii) generating a square sum matrix from the document segment vectors;
(iii) calculating eigenvectors and eigenvalues of the square sum matrix; and
(iv) selecting and outputting the important item of the input document from the calculated eigenvectors and eigenvalues of the square sum matrix;
(d) the processor is further arranged for performing step (d) by:
(i) selecting a definite number of eigenvectors and eigenvalues from the eigenvectors and the eigenvectors;
(ii) generating, with respect to the items in the input document, item vectors in which only components corresponding to the terms included in the items have a first binary value and the other components have as second binary value; and
(iii) obtaining a measure of the importance of the items by using the definite number of eigenvectors, the definite number of eigenvalues, and the item vectors;
(e) the square sum matrix is calculated as:

$$S = \sum_{m=1}^{M} d_m d_m^T$$

where:

M=the number of the document segments, an m-th document segment vector is $d_m=(d_{m1}, \ldots, d_{mN})^T$ and $(m=1, \ldots, M)$, and N=the number of terms, T denotes transpose of a vector, and $d_{mn}$ denotes a value relating to an occurrence frequency of an n-th term occurring in the document segments.

12. The apparatus of claim 11 wherein the processor arrangement is arranged for obtaining the importance measure of the item with respect to the eigenvector of each order by calculating a product of a square inner product between the eigenvector of the order and the item vector, and the eigenvalue of the order.

13. The apparatus of claim 12 wherein the item is a term, and the processor arrangement is arranged for obtaining the importance measure of the item by normalizing with a value of a diagonal component corresponding to each term in the square sum matrix or a value relating thereto.

14. The apparatus of claim 12 wherein the item is a phrase or a sentence and the processor arrangement is arranged for obtaining the importance measure of the item by normalizing with a value of the squared norm of the item vector or a value of a squared sum of inner products between the all document segment vectors and the item vector or a value relating thereto.

15. The apparatus of claim 11 wherein the processor arrangement is arranged for obtaining the importance measure of the item with respect to the input document by using weights calculated from the eigenvalues of respective orders and by a weighted sum of products of a squared inner product between the eigenvector of each order and the item vector, and the eigenvalue of the order over the definite number of orders.

16. The apparatus of claim 15 wherein the processor arrangement is arranged for obtaining the importance measure of the item by normalizing with a value of a diagonal component corresponding to each term in the square sum matrix or a value relating thereto.

17. The apparatus of claim 15 wherein the item is one of a term, a phrase, or a sentence and the processor arrangement is arranged for obtaining the importance measure of the item by normalizing with a value of the squared norm of the item vector or a value of a squared sum of inner products between the all document segment vectors and the item vector or a value relating thereto.

18. The apparatus of claim 11 wherein the items are one of terms, phrases, and sentences.

* * * * *